(12) United States Patent
Pickering

(10) Patent No.: US 11,874,915 B2
(45) Date of Patent: *Jan. 16, 2024

(54) METHODS AND SYSTEMS FOR ACOUSTIC AUTHENTICATION

(71) Applicant: Worldpay, LLC, Symmes Township, OH (US)

(72) Inventor: Daren L. Pickering, Rugby (GB)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,144

(22) Filed: Nov. 30, 2022

(65) Prior Publication Data

US 2023/0105404 A1   Apr. 6, 2023

Related U.S. Application Data

(63) Continuation of application No. 16/233,616, filed on Dec. 27, 2018, now Pat. No. 11,544,370.

(51) Int. Cl.

| | |
|---|---|
| *G06F 21/36* | (2013.01) |
| *G06Q 20/38* | (2012.01) |
| *G06Q 20/40* | (2012.01) |
| *G06T 19/00* | (2011.01) |
| *H04L 9/32* | (2006.01) |
| *G06F 3/04883* | (2022.01) |
| *G06F 3/041* | (2006.01) |
| *G06F 3/0485* | (2022.01) |

(52) U.S. Cl.
CPC ........... *G06F 21/36* (2013.01); *G06Q 20/382* (2013.01); *G06Q 20/4012* (2013.01); *G06T 19/006* (2013.01); *H04L 9/3226* (2013.01); *G06F 3/041* (2013.01); *G06F 3/0485* (2013.01); *G06F 3/04883* (2013.01); *G06F 2221/2103* (2013.01); *G06F 2221/2133* (2013.01)

(58) Field of Classification Search
CPC ............................. G06F 3/04886; G06F 21/31
See application file for complete search history.

(56) References Cited

U.S. PATENT DOCUMENTS

| 8,502,780 | B1 * | 8/2013 | Park | G06F 3/04886 |
| | | | | 345/165 |
| 9,196,111 | B1 * | 11/2015 | Newman | G07F 19/2055 |
| 2014/0240262 | A1 * | 8/2014 | Paul | G06F 3/0488 |
| | | | | 345/173 |

* cited by examiner

*Primary Examiner* — Nhat Huy T Nguyen
(74) *Attorney, Agent, or Firm* — Bookoff McAndrews, PLLC

(57) ABSTRACT

Systems and methods are disclosed for generating an acoustic authentication data entry interface. One method comprises generating a random sequence of characters and a visual user interface element comprising a plurality sections, each section of the visual user interface element being associated with a respective character of the generated random sequence of characters. A section of the visual user interface elements is displayed to a user. Concurrently, an audio recording of a character associated with the displayed section is played to the user. Based on determining user selection of the displayed section, the character associated with the displayed section is logged as part of an authentication data. When all of the characters constituting the authentication data are logged, an electronic transaction authorization request is sent to an acquirer processor.

20 Claims, 4 Drawing Sheets

US 11,874,915 B2

METHODS AND SYSTEMS FOR ACOUSTIC AUTHENTICATION

CROSS-REFERENCE TO RELATED APPLICATION(S)

This patent application is a continuation of and claims the benefit of priority to U.S. Nonprovisional patent application Ser. No. 16/233,616, filed on Dec. 27, 2018, the entirety of which is incorporated herein by reference.

TECHNICAL FIELD

The present disclosure relates to methods and systems for generating a secure authentication data entry interface. More particularly, the present disclosure relates to methods and systems for an acoustic authentication data entry interface configured to obfuscate entry of authentication data.

BACKGROUND

Traditionally, merchants and other store owners have point of sale (POS) terminals that can accept check or payment card from consumers for goods and services. Such POS systems may include PIN pads at which a consumer may enter payment and/or personal information in order to complete payment processing requests for purchases. Increasingly, however, merchants and store owners may interact with consumers in virtual reality environments or remotely over the web (e.g., consumers may make online purchases using consumer devices). Standard PIN pads may have a known arrangement of alphanumeric characters in the form of 12 buttons arranged in 4 rows and 3 columns. The first row may include numbers 1, 2, and 3; the second row may include numbers 4, 5, and 6; the third row may include numbers 7, 8, and 9; and the last row may include "*", 0, and "#". Each of the numbers may also have associated letters of the alphabet in a standard format. This standard configuration means that an individual watching a consumer may easily detect or infer a consumer's PIN number by watching the consumer's selection of buttons and correlating the consumer's selections with standard positions of alphanumeric characters in a PIN pad.

Accordingly, there is a need for improving security in transactions involving and/or requiring entry of authentication data (e.g., personal identification number (PIN), card verification value (CVV), password, an answer to a security question, etc.). More particularly, there is a need for systems and methods that allow users to enter authentication data using an interface that does not correspond to a known or predictable configuration.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for generating an acoustic authentication data entry interface, comprising: generating a random sequence of characters; generating a visual user interface element comprising a plurality sections, each section of the visual user interface element being associated with a respective character of the generated random sequence of characters; displaying a section of the visual user interface element to a user; playing an audio recording of a character associated with the displayed section; based on determining user selection of the displayed section, logging the character associated with the displayed section as part of an authentication data; and based on determining that the authentication data is complete, sending an electronic transaction authorization request to an acquirer processor.

One embodiment provides a system for generating an acoustic authentication data entry interface. The system may comprise one or more processors; and a non-transitory computer readable medium storing instructions which, when executed by the one or more processors, cause the one or more processors to perform a method comprising: generating a random sequence of characters; generating a visual user interface element comprising a plurality sections, each section of the visual user interface element being associated with a respective character of the generated random sequence of characters; displaying a section of the visual user interface element to a user; playing an audio recording of a character associated with the displayed section; based on determining user selection of the displayed section, logging the character associated with the displayed section as part of an authentication data; and based on determining that the authentication data is complete, sending an electronic transaction authorization request to an acquirer processor.

One embodiment provides a non-transitory computer readable medium for generating an acoustic authentication data entry interface. The non-transitory computer readable medium may store instructions that, when executed by one or more processors, cause the one or more processors to perform a method comprising: generating a random sequence of characters; generating a visual user interface element comprising a plurality sections, each section of the visual user interface element being associated with a respective character of the generated random sequence of characters; displaying a section of the visual user interface element to a user; playing an audio recording of a character associated with the displayed section; based on determining user selection of the displayed section, logging the character associated with the displayed section as part of an authentication data; and based on determining that the authentication data is complete, sending an electronic transaction authorization request to an acquirer processor.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
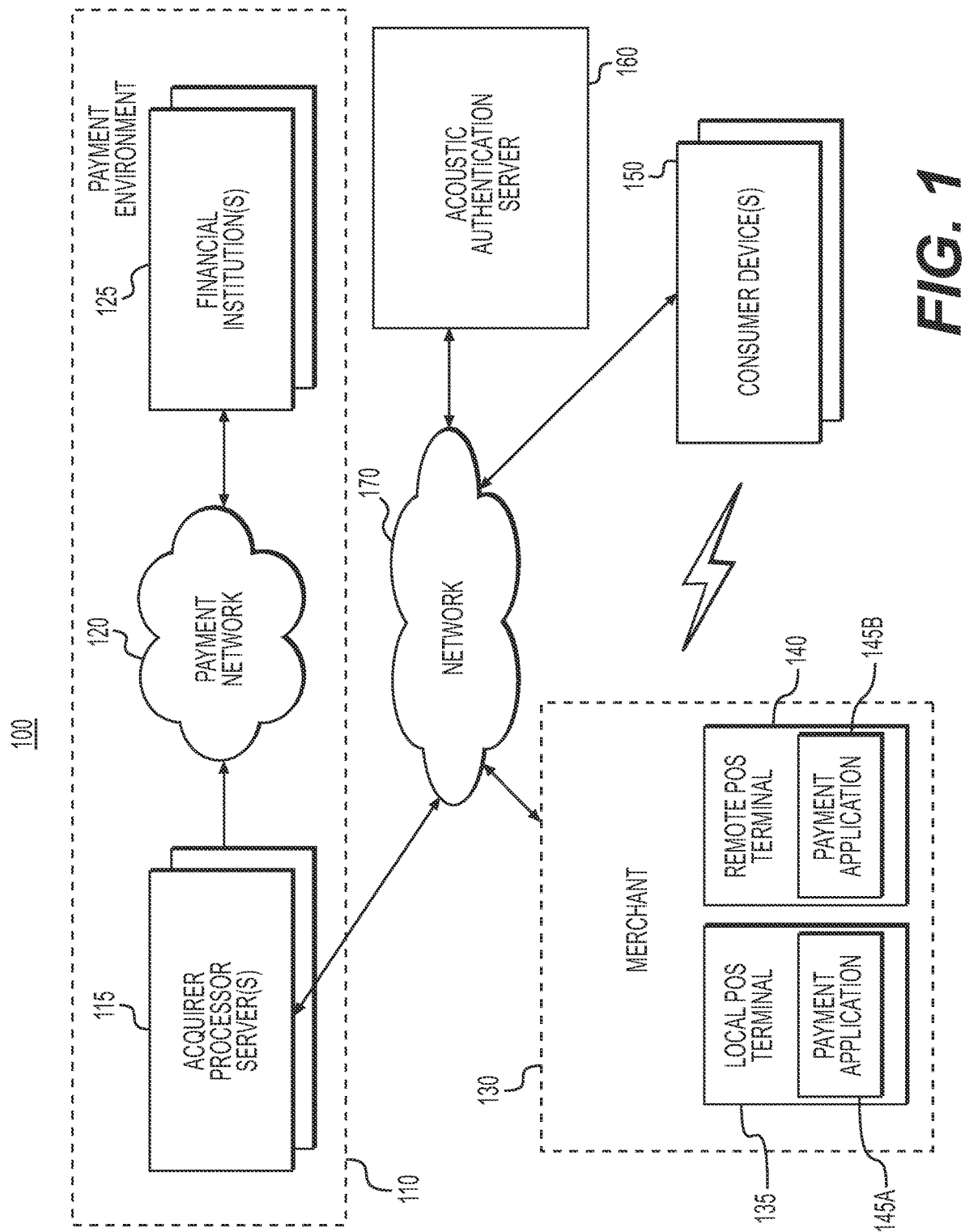
FIG. 1 depicts a block diagram of an electronic payment transaction processing system, according to one aspect of the present disclosure.

The following embodiments describe methods and systems for generating an acoustic authentication data entry interface. More particularly, the acoustic authentication data entry interface may obfuscate entry of authentication data by enabling a user to select characters constituting the authentication data based on sounds audible to the user.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

While some of the embodiments below refer to authentication data entry as being user's entry of a PIN number, no aspect of the present disclosure is specifically limited to the authentication data being a PIN number. It is intended that the following description encompasses the use of the present disclosure with any form of authentication data, including Card Verification Value (CVV), a payment vehicle number (e.g., a credit card number), a password, an answer to a security question, or any other type of payment credential verifying the user's identity through a plurality of (alphanumeric) characters.

Traditionally, merchants and other store owners may accept payment authentication data (e.g., PIN numbers) via point of sale (POS) devices that have buttons arranged in a standardized format of alphanumeric characters. The standardized format typically comprises an arrangement of 12 buttons positioned in 4 rows and 3 columns. This standard arrangement of alphanumeric characters provides easy detectability of a user's authentication data from an observer nearby the user. Such detectability is especially problematic in a virtual reality environment and for visually-impaired individuals, where the user may be less aware of their physical surroundings and the observers near them.

The systems and methods provide an improvement to the current problem of detectable authentication data, by presenting a randomized sequence of characters to select from, using sounds audible only to the user. More particularly, the present embodiment describes a payment authentication environment in which a sound representing each of the randomized sequence of characters is played to a user wearing a headphone. Upon presenting a sound associated with a character, the user may be prompted to make a selection or non-selection. The present embodiment may be implemented in a virtual reality environment, in which the user may make a selection or non-selection by making an appropriate motion or movement. The present embodiment may also be implemented using a touch screen device, in which the user may make a selection or non-selection via a touch screen. Due to the randomization of the character sequence and the presentation of the characters in sounds audible only to the user, a nearby observer cannot detect the user's authentication data just by watching their motions.

Referring now to the appended drawings, FIG. 1 depicts a block diagram of an electronic payment transaction processing system 100, according to one aspect of the present disclosure. In general, FIG. 1 depicts a payment environment 110, a merchant 130, an acoustic authentication server 160, and consumer device(s) 150, all connected via network 170. Network 170 may include the Internet, but may also include other networks such as a corporate WAN, cellular network, satellite network, or combination thereof, for example. The network 170 may be employed to enable data communications between the various entities illustrated in FIG. 1.

As shown in FIG. 1, in an electronic payment transaction processing system 100, a consumer (i.e., a user), during a checkout process with a merchant 130, may make an electronic payment using a local point of sale (POS) terminal 135. Local POS terminal 135 may comprise a computing system consistent with or similar to that depicted in FIG. 4, and may handle face-to-face or in-person transactions. Face-to-face or in-person transactions may refer to local transactions taking place between a merchant 130 and a consumer present in a same venue or location, or in close physical proximity to each other (e.g., during a meeting between the merchant 130 and the consumer, at a brick-and-mortar store of the merchant 130, etc.). In one embodiment, local POS terminal 135 may be a mobile device of the merchant 130 (or a party selling goods/services to a consumer), the mobile device comprising a computing system consistent with or similar to that depicted in FIG. 4. The term "mobile device" used herein may refer to a smart phone, a table, a laptop, a smart watch, a wearable device, a gaming device, a handheld computer, a portable media player, or any other mobile or portable computing device. Local POS terminal 135 may be configured to leverage an external card reader peripheral device to become an ad hoc Point of Sale (POS) platform, using payment application 145A. In other embodiments, local POS terminal 135 may be a POS terminal located at a brick-and-mortar store of the merchant, using payment application 145A to process electronic payment transactions Merchant 130 may also comprise a remote POS terminal 140. The remote POS terminal 140 may comprise a server consistent with or similar to the computing system depicted in FIG. 4, and may handle transactions that occur over a network 170 with consumer devices 150. The consumer device 150 may include, but may not be limited to, a virtual reality (VR) consumer product (e.g., a VR headset, VR or augmented reality (AR) eyewear, a VR immersive system, etc.), a smartphone, a mobile phone, a tablet computer, a laptop, a portable computer, a watch, a wearable device, etc. The remote POS terminal 140 may be in communication with the consumer devices 150 over the network 170 and may provide an electronic payment interface to the consumer devices 150, using payment application 145B. The electronic payment interface may be provided in a variety of forms. In one embodiment, the electronic payment interface may be a web page where a user of the consumer device 150 (i.e., a consumer) can enter payment vehicle information as well as the corresponding authentication data (e.g., PIN, password, CVV, etc.). In another embodiment, the electronic payment interface may be a virtual reality environment where a user can provide a payment vehicle (or payment vehicle information) as well as the corresponding authentication data. In yet another embodiment, the electronic payment interface may be a web-based application through which a user can provide a payment vehicle (or payment vehicle information) as well as the corresponding authentication data. In yet another embodiment, the electronic payment interface may provide an installable mobile application to the consumer devices 150, so that a consumer may use the mobile application to access an electronic payment interface to provide a payment vehicle (or payment vehicle information) as well as the corresponding authentication data.

The electronic payment transaction processing system 100 may also comprise an acoustic authentication server 160. As will be discussed in greater detail below, the acoustic authentication server 160 may enable consumers to enter authentication data in their respective environments in a highly secure manner. For example, after a consumer provides a payment vehicle as a form of payment, the corresponding POS terminal (i.e., local POS terminal 135 or remote POS terminal 140) may request authentication data from the consumer. Instead of using a standard PIN pad, the consumer may provide the authentication data using an acoustic authentication data entry interface enabled by the acoustic authentication server 160. By providing authentication data via the acoustic authentication data entry interface, the possibility of the authentication data being stolen or predicted by a person other than the consumer may be substantially reduced.

Because merchant 130 generally can use a bank or financial institution that is different from that of the consumer, an acquirer processor 115 may handle the electronic payment transactions between the financial institution of the consumer and that of the merchant 130. Upon receiving a payment vehicle (or payment vehicle information) and the corresponding authentication data, the POS terminal (i.e., local POS terminal 135 or remote POS terminal 140) may send an electronic payment authorization request by way of the network 170 to an acquirer processor 115. Acquirer processor 115 may then request, by way of payment network 120, an electronic transfer of funds to the financial institution 125 associated with the merchant 130.

Figure 2:
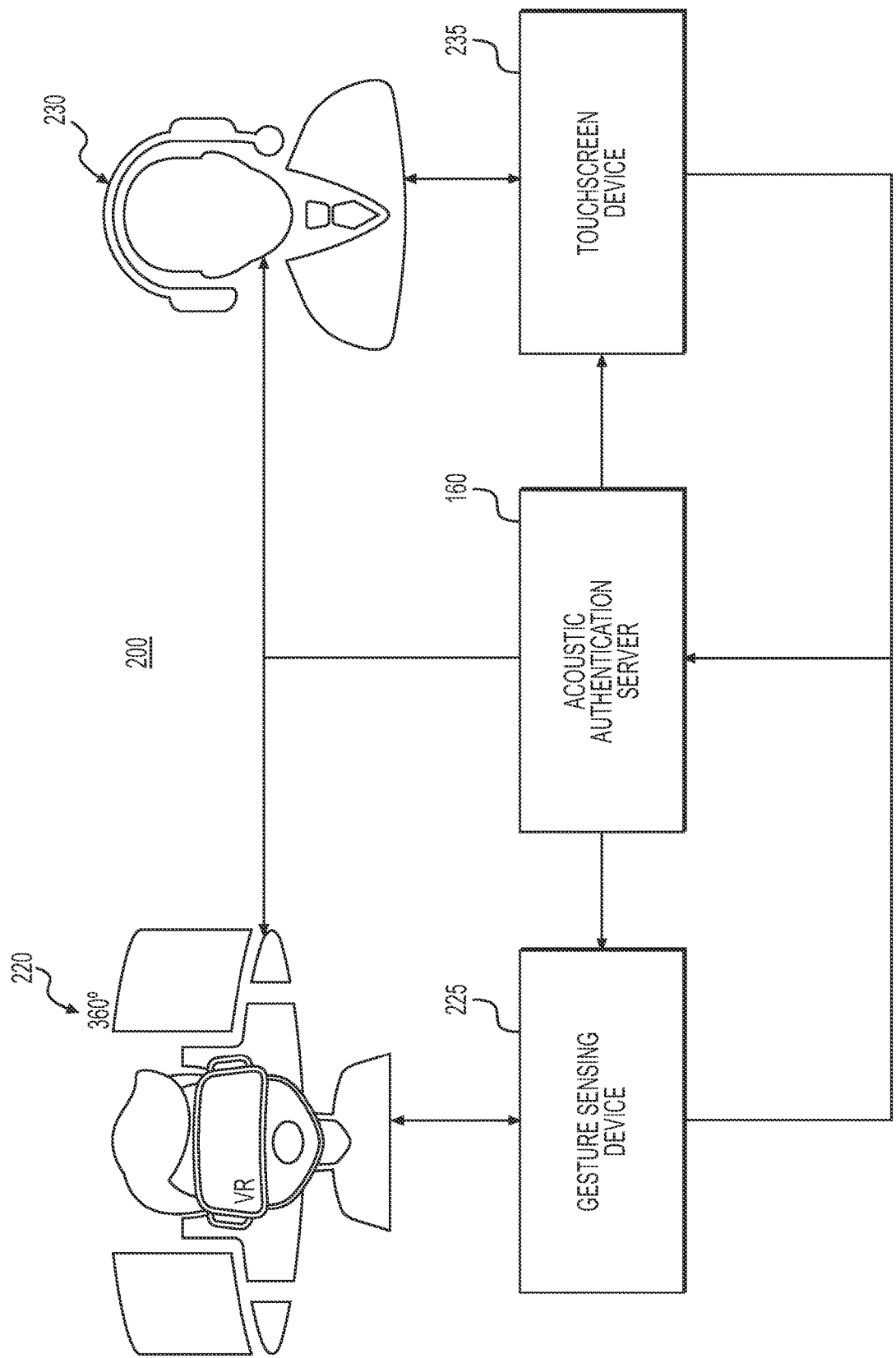
FIG. 2 depicts an exemplary system infrastructure for generating an acoustic authentication data entry interface, according to one aspect of the present disclosure.
Figure 4:
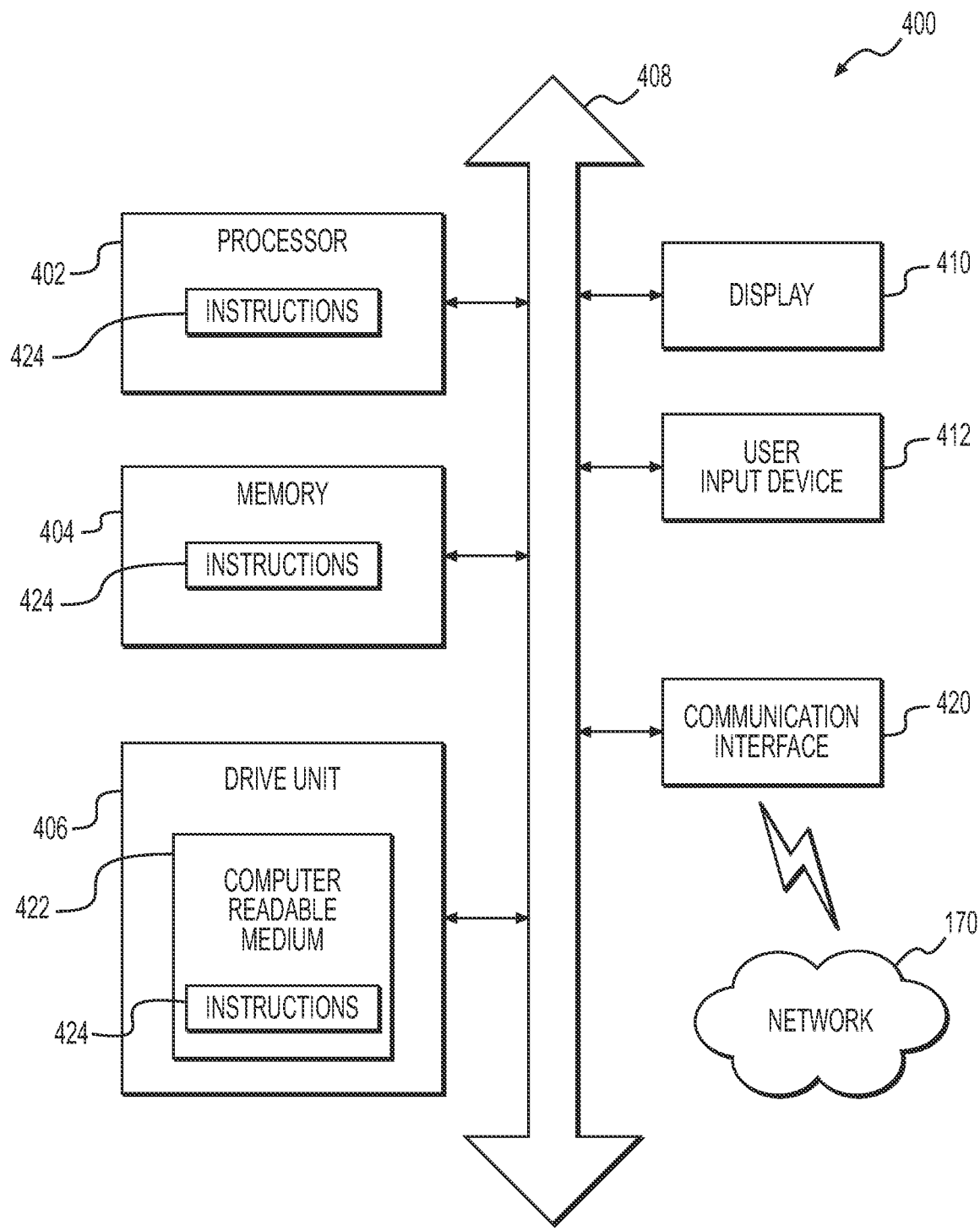
FIG. 4 illustrates an implementation of a general computer system that may execute techniques presented herein.

It should be noted that, although local POS terminal 135, remote POS terminal 140, acoustic authentication server 160, and consumer device 150 are shown as separate entities in FIG. 2, all or a portion of these components (and the steps performed thereof) may be implemented in a single computing device consistent with or similar to that depicted in FIG. 4. For example, in one embodiment, acoustic authentication server 160 and consumer device 150 may be implemented on a single computing device. In another embodiment, acoustic authentication server 160 and a local POS terminal 135 may be implemented on a single computing device. In yet another embodiment, acoustic authentication server 160 and a remote POS terminal 140 may be implemented on a single computing device. In yet another embodiment, local POS terminal 135, remote POS terminal 140, acoustic authentication server 160, and consumer device 150 may indeed be implemented separately on their respective computing devices. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

FIG. 2 depicts an exemplary system infrastructure for generating an acoustic authentication data entry interface, according to one aspect of the present disclosure. In particular, FIG. 2 depicts an exemplary system infrastructure 200 of an acoustic authentication server 160 in communication with devices used by a consumer to access the acoustic authentication data entry interface. In one embodiment, the exemplary system infrastructure 200 may comprise an acoustic authentication server 160, a virtual reality (VR) device 220, a gesture sensing device 225 in communication with the VR device 220, a headphone 230 (e.g., a full-sized headphone, an earphone, etc.), and a touchscreen device 235 in communication with the headphone 230 (e.g., a smartphone, a tablet, a computer with a touchscreen, a POS terminal with a touchscreen, etc.). The touchscreen device 235 may be implemented at the local POS terminal 135 and/or the consumer device 150, and may support connections with various types of headphones. The acoustic authentication server 160 may be configured to generate an acoustic authentication data entry interface to be accessed by consumers via a VR device 220 coupled to a gesture sensing device 225 and/or a touchscreen device 235 and a headphone 230 coupled thereto. More particularly, data enabling acoustic authentication data entry may be exchanged between the acoustic authentication server 160 and the VR device 220/gesture sensing device 225, and/or between the acoustic authentication server 160 and the touchscreen device 235/headphone 230. For example, in one embodiment, the VR device 220 may receive a set of randomized sequence of characters from the acoustic authentication server 160, may display a visual user interface element comprising a plurality of sections associated with the sequence of characters in a VR environment, and may play audio recordings associated with each of the characters in the VR environment. The VR device 220 may have speakers (e.g., headphones) implemented therein. The gesture sensing device 225 coupled to the VR device 220 may detect user selection or non-selection of a section associated with a respective character, and may report the selection or non-selection to the acoustic authentication server 160 for further processing. In another embodiment, the touchscreen device 235 may receive a set of randomized sequence of characters from the acoustic authentication server 160, may display a visual user interface element comprising a plurality of sections associated with the sequence of characters on a touchscreen, and may play audio recording associated with each of the characters using the headphone 230 in communication with the touchscreen device 235. The touchscreen device 235 may detect user selection or non-selection of a section associated with a respective character, and may report the selection or non-selection to the acoustic authentication server 160 for further processing.

It should be noted that the VR device 220 and the gesture sensing device 225 may typically be implemented at the consumer device 150 side. However, the VR device 220 and the gesture sensing device 225 may also be implemented at the local POS terminal 135 side. In other words, the acoustic authentication data entry interface in a virtual reality environment may be experienced at either the local POS terminal 135 or the consumer device 150. Further, the touchscreen device 235 with a headphone 230 connected thereto may be implemented at the consumer device 150 side as well as the local POS terminal 135 side. In other words, the acoustic authentication data entry interface using a touchscreen device 235 and a headphone 230 may be experienced at either the local POS terminal 135 or the consumer device 150.

Figure 3:
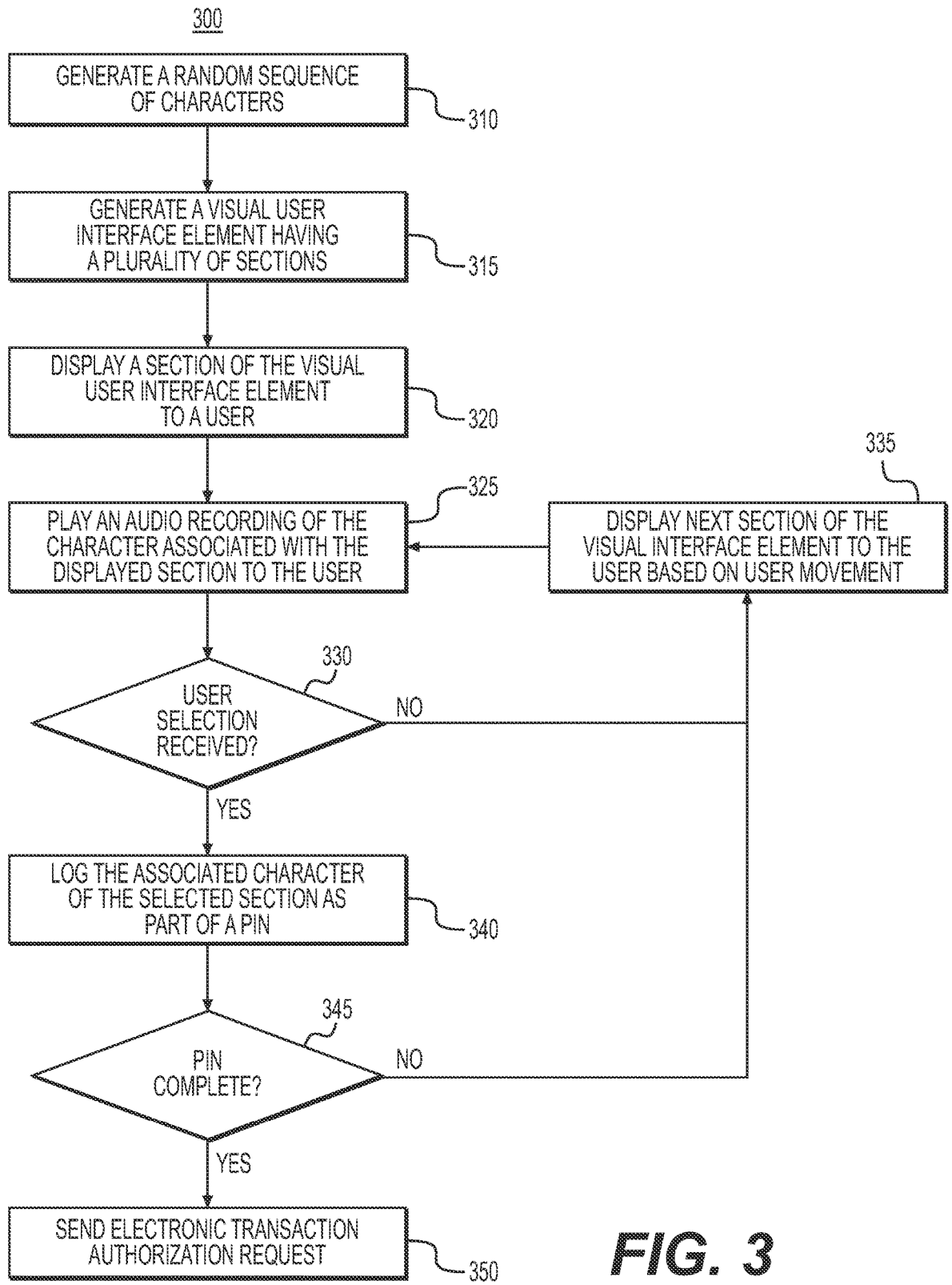
FIG. 3 depicts a flowchart of a method of generating an acoustic authentication data entry interface, according to one aspect of the present disclosure.

FIG. 3 depicts a flowchart of a method of generating an acoustic authentication data entry interface, according to one aspect of the present disclosure. Notably, steps of method 300 may be performed by an acoustic authentication server 160. In one embodiment, method 300 may be performed in response to a user providing a payment vehicle (or payment vehicle information) during an electronic payment transaction. At step 310, the acoustic authentication server 160 may generate a random sequence of characters. The characters may comprise alphanumeric characters, and may also comprise now-known or later-developed symbols that can be provided to a computing system via an input device. All or a portion of the generated random sequence of characters may make up the user's authentication data such as, e.g., a PIN. At step 315, the acoustic authentication server 160 may generate a visual user interface element having a plurality of sections. The visual user interface element having a plurality of sections may be configured to be displayed or presented using the VR device 220 or the touch screen device 235. Each section of the visual user interface may be associated with one of the generated random sequence of characters. However, each section of the visual user interface element, when displayed to the user, may be without visual indicia of the respective character. In one embodiment, the plurality of sections constituting the visual user interface element may be visualized as a plurality of circular or polygonal boxes/panels/tiles spaced apart from each other horizontally or vertically, each box/panel/tile having no visual indicia of the respective associated character. From the user's point of view, the plurality of circular or polygonal boxes/panels/tiles may be spaced apart from each other horizontally along a circumference of a circle, providing an effect that a circle of boxes/panels/tiles surround the user in 360 degrees.

With continuing reference to FIG. 3, at step 320, the acoustic authentication server 160 may display a section of the visual user interface element to the user (i.e., may send instructions or commands to the VR device 220 or the touch screen device 235 to display a section of the visual user interface elements). As alluded to above, the displayed section may be without any indication of the character associated with the section. For example, the displayed section may be a transparent or opaque box/panel/tile in any shape, without any indication of the character associated with the section as discussed above in reference to step 315. At step 325, the acoustic authentication server 160 may play an audio recording of the character associated with the displayed section to the user (i.e., may send instructions or commands to the VR device 220 or the touch screen device 235 to play an audio recording of the character associated with the displayed section, through their respective headphones). Such an action of playing an audio recording of the character associated with a section may be referred to as "calling out" a character associated with a section. The user, upon hearing the audio recording of the character associated with the displayed section, will be able to recognize which character the displayed section is associated with. Step 325 may be executed concurrently or substantially concurrently with step 320.

At step 330, the acoustic authentication server 160 may determine whether user selection of the displayed section is received. The user may select (i.e., user selection) or skip (i.e., user non-selection) the displayed section by making an appropriate motion or movement. For example, in a VR environment, the user may be able to select the displayed section by a grabbing, dragging and dropping, pointing, or tapping motion, and skip the displayed section by a swiping or sliding motion. Using a touch screen device 235, the user may be able to select the displayed section by a tapping, dragging and dropping, or clicking motion, and skip the displayed section by a swiping motion. If it is determined that the user selected the displayed section, method 300 may proceed to step 340 where the character associated with the selected section may be recorded/logged as part of the user's PIN. If it is determined that the user did not select (i.e., skipped) the displayed section, method 300 may proceed to step 335 where the acoustic authentication server 160 may display a next section of the visual interface element based on the movement associated with the user's non-selection. For instance, if the user swipes to right, a next section that is positioned at the right side of the previously-displayed section may be displayed. If the user swipes to left, a next section that is positioned at the left side of the previously-displayed section may be displayed. Upon displaying the next section, method 300 loops back to step 325 where the acoustic authentication server 160 may play an audio recording of the character associated with the next section just displayed at step 335. Step 325 may be executed concurrently or substantially concurrently with step 335.

Steps 335, 325, 330, 340, and 345 may be executed iteratively until a complete set of characters constituting the user's PIN are selected. At step 345, the acoustic authentication server 160 may determine whether a complete set of characters constituting the user's PIN (i.e., a complete set) have been logged/recorded. If it is determined that a complete set has been received, method 300 may proceed to step 350 where the acoustic authentication server 160 may send an electronic transaction authorization request to payment environment 110 (e.g., to an acquirer processor 115). In some embodiments, the acoustic authentication server 160 may transmit instructions to the local POS terminal 135 or the remote POS terminal 140 to send an electronic transaction authorization request to payment environment 110. If it is determined that a complete set has not been received, method 300 may proceed to step 335 in order to receive additional selection(s).

In an alternative embodiment, the acoustic authentication server 160 may generate a new randomized sequence of characters upon each determination that a complete set has not been received at step 345. For example, method 300 may proceed from step 345 to step 310 (instead of proceeding to step 335), upon determining that a complete set has not been received at step 345. Under this scenario, steps 310, 315, 320, 325, 330, 340, and 345 (and 335 if any iteration involves a user non-selection) may be executed iteratively until a complete set of characters constituting the user's PIN are selected. Compared to the embodiment depicted explicitly in FIG. 3, this alternative embodiment may require more processing resources and longer processing time, but may provide a more robust and secure authentication data entry interface.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 4 illustrates an implementation of a general computer system designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 400 can be implemented using electronic devices that provide voice, video, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 includes a cache or random-access memory for the processor 402. In alternative implementations, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 410, such as a liquid crystal display (LCD), an organic light emitting diode (OLED), a flat panel display, a solid-state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 406.

Additionally or alternatively, the computer system 400 may include an input device 412 configured to allow a user to interact with any of the components of system 400. The input device 412 may be a number pad, a keyboard, or a cursor control device, such as a mouse, or a joystick, touch screen display, remote control, or any other device operative to interact with the computer system 400.

The computer system 400 may also or alternatively include a disk or optical drive unit 406. The disk drive unit 406 may include a computer-readable medium 422 in which one or more sets of instructions 424, e.g. software, can be embedded. Further, the instructions 424 may embody one or more of the methods or logic as described herein. The instructions 424 may reside completely or partially within the memory 404 and/or within the processor 402 during execution by the computer system 400. The memory 404 and the processor 402 also may include computer-readable media as discussed above.

In some systems, a computer-readable medium 422 includes instructions 424 or receives and executes instructions 424 responsive to a propagated signal so that a device connected to a network 170 can communicate voice, video, audio, images, or any other data over the network 170. Further, the instructions 424 may be transmitted or received over the network 170 via a communication port or interface 420, and/or using a bus 408. The communication port or interface 420 may be a part of the processor 402 or may be a separate component. The communication port 420 may be created in software or may be a physical connection in hardware. The communication port 420 may be configured to connect with a network 170, external media, the display 410, or any other components in system 400, or combinations thereof. The connection with the network 170 may be a physical connection, such as a wired Ethernet connection or may be established wirelessly as discussed below. Likewise, the additional connections with other components of the system 400 may be physical connections or may be established wirelessly. The network 170 may alternatively be directly connected to the bus 408.

While the computer-readable medium 422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 422 may be non-transitory, and may be tangible.

The computer-readable medium 422 can include a solid-state memory such as a memory card or other package that houses one or more non-volatile read-only memories. The computer-readable medium 422 can be a random-access memory or other volatile re-writable memory. Additionally or alternatively, the computer-readable medium 422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 400 may be connected to one or more networks 170. The network 170 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 170 may include wide area networks (WAN), such as the Internet, local area networks (LAN), campus area networks, metropolitan area networks, a direct connection such as through a Universal Serial Bus (USB) port, or any other networks that may allow for data communication. The network 170 may be configured to couple one computing device to another computing device to enable communication of data between the devices. The network 170 may generally be enabled to employ any form of machine-readable media for communicating information from one device to another. The network 170 may include communication methods by which information may travel between computing devices. The network 170 may be divided into sub-networks. The sub-networks may allow access to all of the other components connected thereto or the sub-networks may restrict access between the components. The network 170 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for generating an acoustic authentication data entry interface, the method comprising:
    generating a random sequence of characters that includes characters constituting authentication data of a user;
    generating a visual user interface element comprising a plurality of sections, each section of the visual user interface element being associated with a respective character of the generated random sequence of characters;
    displaying a section of the visual user interface element to the user that is without a visual indicia of a character associated with the section;
    playing an audio recording of the character associated with the section, based on displaying the section;
    prompting the user to make a selection of the character by making a first type of user gesture or to make a non-selection of the character by making a second type of user gesture, based on playing the audio recording;
    detecting a user gesture performed in association with the section, based on prompting the user to make the selection of the character or the non-selection of the character;
    logging the character as a part of the authentication data of the user based on the user gesture corresponding to the first type of gesture; and
    based on determining that a complete set of the characters constituting the authentication data of the user has been logged based on a set of user selections of a set of sections of the visual user interface element, sending an electronic transaction authorization request.

2. The method of claim 1, wherein the visual user interface element is displayed in a virtual reality environment.

3. The method of claim 1, wherein the visual user interface element is displayed in a touchscreen of a mobile device.

4. The method of claim 1, wherein the first type of gesture is one of a grabbing motion, a dragging motion and a dropping motion, a pointing motion, or a tapping motion.

5. The method of claim 1, wherein the second type of gesture is one of a swiping motion or a scrolling motion.

6. The method of claim 1, wherein generating the random sequence of characters occurs iteratively in response to user selections.

7. The method of claim 1, wherein the authentication data comprises one or more of a personal identification number (PIN), a password, and an answer to a security challenge question.

8. A device comprising:
a memory configured to store instructions; and
a processor configured to execute the instructions to perform operations comprising:
generating a random sequence of characters that includes characters constituting authentication data of a user;
generating a visual user interface element comprising a plurality of sections, each section of the visual user interface element being associated with a respective character of the generated random sequence of characters;
displaying a section of the visual user interface element to the user that is without a visual indicia of a character associated with the section;
playing an audio recording of the character associated with the section, based on displaying the section;
prompting the user to make a selection of the character by making a first type of user gesture or to make a non-selection of the character by making a second type of user gesture, based on playing the audio recording;
detecting a user gesture performed in association with the section, based on prompting the user to make the selection of the character or the non-selection of the character;
logging the character as a part of the authentication data of the user based on the user gesture corresponding to the first type of gesture; and
based on determining that a complete set of the characters constituting the authentication data of the user has been logged based on a set of user selections of a set of sections of the visual user interface element, sending an electronic transaction authorization request.

9. The device of claim 8, wherein the visual user interface element is displayed in a virtual reality environment.

10. The device of claim 8, wherein the visual user interface element is displayed in a touchscreen of a mobile device.

11. The device of claim 8, wherein the first type of gesture is one of a grabbing motion, a dragging motion and a dropping motion, a pointing motion, or a tapping motion.

12. The device of claim 8, wherein the second type of gesture is one of a swiping motion or a scrolling motion.

13. The device of claim 8, wherein generating the random sequence of characters occurs iteratively in response to user selections.

14. The device of claim 8, wherein the authentication data comprises one or more of a personal identification number (PIN), a password, and an answer to a security challenge question.

15. A non-transitory computer-readable medium configured to store instructions that, when executed by a processor, cause the processor to perform operations comprising:
generating a random sequence of characters that includes characters constituting authentication data of a user;
generating a visual user interface element comprising a plurality of sections, each section of the visual user interface element being associated with a respective character of the generated random sequence of characters;
displaying a section of the visual user interface element to the user that is without a visual indicia of a character associated with the section;
playing an audio recording of the character associated with the section, based on displaying the section;
prompting the user to make a selection of the character by making a first type of user gesture or to make a non-selection of the character by making a second type of user gesture, based on playing the audio recording;
detecting a user gesture performed in association with the section, based on prompting the user to make the selection of the character or the non-selection of the character;
logging the character as a part of the authentication data of the user based on the user gesture corresponding to the first type of gesture; and
based on determining that a complete set of the characters constituting the authentication data of the user has been logged based on a set of user selections of a set of sections of the visual user interface element, sending an electronic transaction authorization request.

16. The non-transitory computer-readable medium of claim 15, wherein the visual user interface element is displayed in a virtual reality environment.

17. The non-transitory computer-readable medium of claim 15, wherein the visual user interface element is displayed in a touchscreen of a mobile device.

18. The non-transitory computer-readable medium of claim 15, wherein the first type of gesture is one of a grabbing motion, a dragging motion and a dropping motion, a pointing motion, or a tapping motion.

19. The non-transitory computer-readable medium of claim 15, wherein the second type of gesture is one of a swiping motion or a scrolling motion.

20. The non-transitory computer-readable medium of claim 15, wherein generating the random sequence of characters occurs iteratively in response to user selections.

* * * * *